(12) United States Patent
Tang et al.

(10) Patent No.: US 7,774,418 B2
(45) Date of Patent: Aug. 10, 2010

(54) METHOD, SYSTEM AND CLIENT FOR TRANSMITTING PREVIEW MESSAGE IN INSTANT MESSAGING SYSTEM

(75) Inventors: Mu Tang, Shenzhen (CN); Yan Chen, Shenzhen (CN); Songtao Lin, Shenzhen (CN); Qingming Wang, Shenzhen (CN); Hexing Zhang, Shenzhen (CN); Fei Yu, Shenzhen (CN); Weiguang Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 335 days.

(21) Appl. No.: 11/857,116

(22) Filed: Sep. 18, 2007

(65) Prior Publication Data
US 2008/0043941 A1  Feb. 21, 2008

Related U.S. Application Data (63) Continuation of application No. PCT/CN2006/000418, filed on Mar. 17, 2006.

(30) Foreign Application Priority Data

Mar. 19, 2005  (CN) ..................... 2005 1 0056113

(51) Int. Cl.
*G06F 15/16* (2006.01)
(52) U.S. Cl. .................. 709/206; 709/204; 709/205; 709/227; 707/1; 707/10; 707/103; 455/405; 455/466
(58) Field of Classification Search ......... 709/204–206, 709/227; 707/1, 10, 103; 455/405, 466
See application file for complete search history.

(56) References Cited

U.S. PATENT DOCUMENTS

| 7,120,455 | B1 * | 10/2006 | Chen et al. | .................. 455/466 |
| 2002/0026483 | A1 * | 2/2002 | Isaacs et al. | ................ 709/206 |
| 2004/0143633 | A1 * | 7/2004 | McCarty | ..................... 709/206 |

(Continued)

FOREIGN PATENT DOCUMENTS

CN  1450763 A  10/2003

*Primary Examiner*—Wing F Chan
*Assistant Examiner*—Benjamin M Thieu
(74) *Attorney, Agent, or Firm*—Leydig, Voit & Mayer, Ltd.

(57) ABSTRACT

A system, client and method for transmitting preview message in an instant messaging system are disclosed by the present invention. And the system includes: a receiver (400) including a first preview message processing module (401), a first preview message display module (402) and a first receiving module (403); a sender (100) including a second preview message processing module (101) and a second sending module (104); an instant messaging server (200) for transmitting an instant customized message between the sender (100) and the receiver (400); and an Internet (300) for transmitting an instant message between the sender (100) and the receiver (400); wherein the second preview message processing module (101) is configured to convert the preview message received into a code, and transmit the code to the second sending module (104); the second sending module (104) is configured to send the code to the first receiving module (403) via the Internet (300); the first receiving module (403) is configured to send the code to the first preview message processing module (401); the first preview message processing module (401) is configured to convert the code into a prompt message indicating the preview message, and send the prompt message to the first preview message display module (402) for prompt.

23 Claims, 8 Drawing Sheets

U.S. PATENT DOCUMENTS

2004/0162877 A1* 8/2004 Van Dok et al. ............ 709/204
2004/0249900 A1* 12/2004 Karstens .................... 709/207
2005/0027669 A1* 2/2005 Day et al. .................... 707/1

* cited by examiner

METHOD, SYSTEM AND CLIENT FOR TRANSMITTING PREVIEW MESSAGE IN INSTANT MESSAGING SYSTEM

This application is a continuation of International Patent Application No. PCT/CN2006/000418, filed Mar. 17, 2006, which claims priority to Chinese Patent Application No. 200510056113.4, filed Mar. 19, 2005, both of which are hereby incorporated by reference.

FIELD OF THE INVENTION

The present invention relates to an instant messaging system, and particularly, to a system, a client and method for transmitting preview message in the instant messaging system.

BACKGROUND OF THE INVENTION

Along with development of sciences and technologies, more and more people pay attention to an instant messaging system. And various communication technologies implementing instant messaging between people has gradually been recognized and accepted. For example, in daily life, the instant messaging system has become an important communication tool, facilitating the work, life and study of people.

The instant messaging system implements a point-to-point message transmission in real time via the Internet, and the point-to-point message transmission includes a transmission of files, words, figures, voices or videos. The instant messaging system, serving as one mode of instant communication using Internet, provides a convenient interaction between users, and charges with a cheaper price. Therefore, the instant messaging system has been spread widely within a short time.

Figure 1:
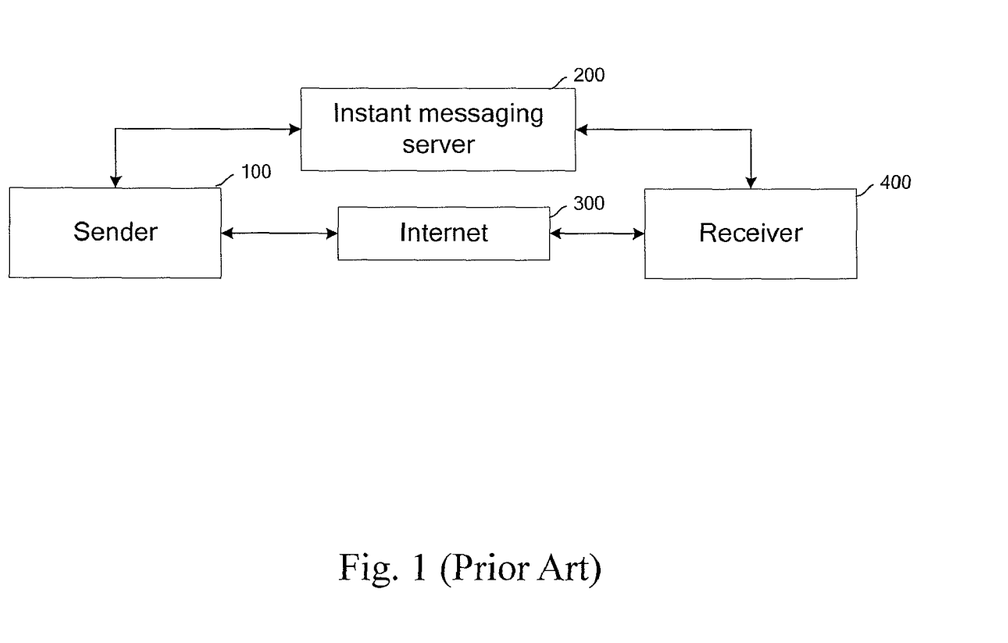
FIG. 1 is a network structure schematic diagram of conventional instant messaging system.

FIG. 1 is a network structure schematic diagram of a conventional instant messaging system. Referring to FIG. 1, a network includes a sender 100, an instant messaging server 200, an Internet 300 and a receiver 400. The sender 100 and the receiver 400 perform an interaction of instant customized message via the instant messaging server 200, i.e., a message channel between the sender 100 and the receiver 400 is established via the Internet 300. After a coding method and a data format associated with the instant message is specified, the sender 100 and the receiver 400 perform an instant message transmission via the Internet 300, so that an instant messaging can be completed. Instant messaging modules are respectively set in the sender 100 and the receiver 400 for the instant messaging between the sender 100 and the receiver 400.

An interaction of word, voice or/and video and via the Internet can be implemented via the instant messaging system, which can implement a share of files, figures or/and videos, and facilitate life and study of people. However, before the sender 100 transmits the instant message, the sender 100 needs to organize preview message firstly, such as the sender 100 needs to input words via a keyboard, copy and paste figures by clicking a mouse. During a period of the sender 100 organizing the preview message, the receiver 400 knows nothing about a condition of sender; so a non-interaction time slot will be generated during this period. So the real time and efficiency of interaction via the instant messaging system are affected badly.

SUMMARY OF THE INVENTION

The present invention provides a system for transmitting preview message in an instant messaging system. The system may transmit the preview message of a sender to a receiver for display, and avoid the real time and efficiency of interaction via the instant messaging system being affected badly.

The present invention provides a client for transmitting preview message in an instant messaging system. The client may transmit the preview message collected or prompt the preview message received, and avoid the real time and efficiency of interaction via the instant messaging system being affected badly.

The present invention provides a method for transmitting preview message in an instant messaging system. In the method, the preview message of sender can be transmitted to the receiver for display, and the real time and efficiency of interaction via the instant messaging system are not affected badly.

A system for transmitting preview message in an instant messaging system includes: a receiver including a first preview message processing module, a first preview message display module and a first receiving module; a sender including a second preview message processing module and a second sending module; an instant messaging server for transmitting an instant customized message between the sender and the receiver; and an Internet for transmitting an instant message between the sender and the receiver; and the second preview message processing module is configured to convert the preview message received into a code, and transmit the code to the second sending module; the second sending module is configured to send the code to the first receiving module via the Internet; the first receiving module is configured to send the code to the first preview message processing module; the first preview message processing module is configured to convert the code into a prompt message indicating the preview message, and send the prompt message to the first preview message display module for prompt.

A client for transmitting preview message in an instant messaging system includes: a preview message processing module, a preview message display module, a sending module and a receiving module; and the preview message processing module is configured to convert a preview message received into a code, and send the code to the sending module; and is configured to convert the code received from the receiving module into a prompt message indicating the preview message, send the prompt message to the preview message display module for prompt; the sending module is configured to transmit the code from the preview message processing module; the receiving module is configured to send the code received to the preview message processing module.

A method for transmitting preview message in an instant messaging system includes: collecting, by a sender, a preview message, converting the preview message into a code based on a corresponding relation between the code and the preview message, and sending the code to a receiver; converting, by the receiver, the code received from the sender into a prompt message indicating the preview message for prompt.

As can be seen from the abovementioned, the present invention provides a system and client for transmitting preview message in an instant messaging system. The system and client may transmit the preview message collected by the sender to the receiver for prompt, or send the preview message collected by the receiver to the sender for prompt by setting modules associated with the preview message in the client. So the non-interaction time slot will not occur when a user organizes the preview message, and the real time and efficiency of interaction via the instant messaging system would not be affected badly.

Embodiments of the present invention provide a method for transmitting preview message in an instant messaging system. In the method, the preview message collected by the sender may be transmitted to the receiver for prompt, so that the non-interactive time slot will not occur when a user organizes preview message, and the real time and efficiency of interaction via the instant messaging system would not be affected badly. Furthermore, to avoid the resource waste of the instant messaging system caused by the sender repeatedly sending the code corresponding to the preview message to the receiver when the user organizes the preview message, the sender initiates a timer while the sender transmits the code corresponding to the preview message, and determines whether detect a new preview message within a time period of the timer; if there is the new preview message, the sender re-initiates the timer while the sender sends a code corresponding to the new preview message, or the sender re-initiates the timer to perform the abovementioned operation repeated, without sending the code corresponding to the new preview message.

DETAILED DESCRIPTION OF THE INVENTION

This invention is hereinafter described in detail with reference to accompanying drawings and embodiments, so as to make the technical solution and merits of the present invention more apparent.

Figure 2:
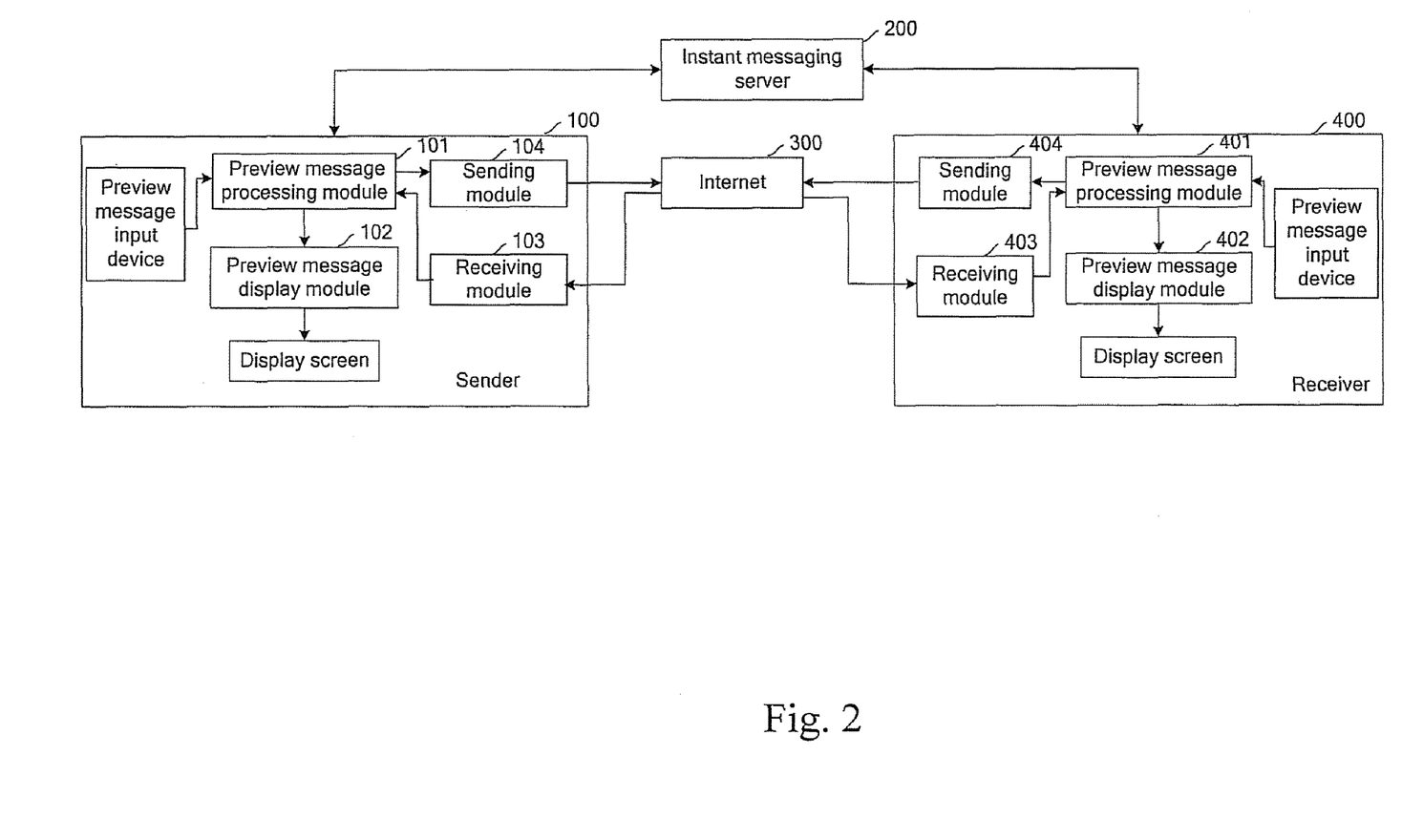
FIG. 2 is a network structure schematic diagram of instant messaging system in accordance with the present invention.

Embodiments of the present invention respectively set modules associated with preview message at a sender and a receiver, so that the preview message of sender can be transmitted to the receiver for display. FIG. 2 is a network structure schematic diagram of instant messaging system in accordance with the present invention. Referring to FIG. 2, the network includes a sender 100, an instant messaging server 200, an Internet 300 and a receiver 400. The sender 100 further includes: a preview message processing module 101, a preview message display module 102, a sending module 104 and a receiving module 103. All of the abovementioned modules 101-104 can be set in the instant messaging module of the existing sender 100. The sending module 104 and the receiving module 103 may also be set in the instant messaging module. The receiver 400 further includes: a preview message processing module 401, a preview message display module 402, a sending module 404 and a receiving module 403. And all of the abovementioned modules 401-404 can be set in the instant messaging module of the receiver 400; the sending module 404 and the receiving module 403 may also be set in the instant messaging module.

In the sender 100, the preview message processing module 101 performs a message interaction with the sending module 104, the receiving module 103, the preview message display module 102 and a preview message input device existing respectively. And the preview message processing module 101 acquires a corresponding code from preview message inputted by the preview message input device based on a preset corresponding relation between the preview message and the code, and sends the corresponding code to the sending module 104. Alternatively the preview message processing module 101 sends the preview message to the sending module 104, after the preview message processing module 101 acquires the corresponding preview message from the code received from the receiving module 103 based on the preset corresponding relation between the preview message and the code.

The preview message display module 102 receives the preview message sent by the preview message processing module 101, and prompting the preview message to a user via a display screen or other prompt devices.

The sending module 104 sends the code received from the preview message processing module 101 to the receiving module 403 of receiver 400 via the Internet.

The receiving module 103 sends the code received from the sending module 404 of receiver 400 to the preview message processing module 101.

Correspondingly, in the receiver 400, the preview message processing module 401 performs a message interaction with the sending module 404, the receiving module 403, the preview message display module 402 and the preview message input device existing respectively. And the preview message processing module 401 converts the code received from the sending module 104 of sender 100 into the preview message, and provides the preview message to the user via a display screen or other prompt devices. Alternatively the preview message processing module 401 converts the preview message inputted by the preview message input device into the code, and sends the code to the receiving module 103 of sender 100 via the Internet.

As can be seen, in the receiver 400 or in the sender 100, modules associated with the preview message are the same; therefore, the receiver 400 and the sender 100 can be regarded as one client of instant messaging system. And the client of instant messaging system is used for not only sending preview message to other clients, but also receiving preview message sent by other clients.

Certainly, to simplify network structure of the instant messaging system, the sender 100 may also only include modules associated with sending preview message, for example, the preview message processing module 101 and the sending module 104. The receiver 400 may also only include modules associated with receiving preview message, for example, the receiving module 403, a preview message processing module 401 and a preview message display module 402.

Figure 3:
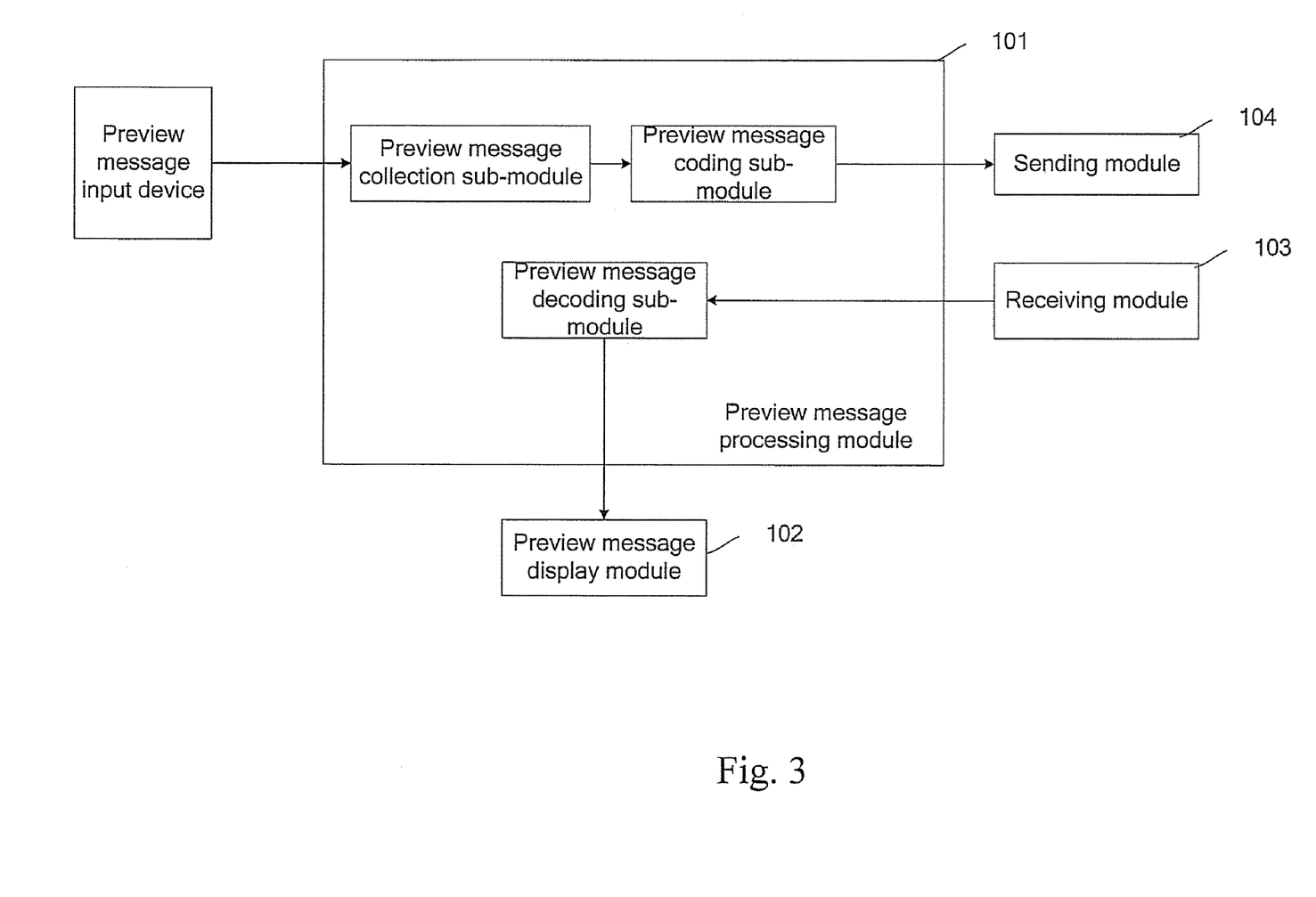
FIG. 3 is a structure schematic diagram of preview message processing module in accordance with the present invention.

FIG. 3 is a structure schematic diagram of preview message processing module in accordance with the present invention. Referring to FIG. 3, in the receiver 400 or the sender 100, the preview message processing module 101 or the preview message processing module 401 further includes a preview message collection sub-module, a preview message coding sub-module and a preview message decoding sub-module. The preview message collection sub-module performs a message interaction with a preview message input device and the preview message coding sub-module respectively. And the preview message collection sub-module receives the preview message inputted by the preview message input device, sends the preview message to the preview message coding sub-module. The preview message coding sub-module is connected to the preview message collection sub-module and the sending module 104 or the sending module 404. And the preview message coding sub-module converts the preview message received from the preview message collection sub-module into a code based on a preset corresponding relation between the preview message and the code, and sends the code to the sending module 104 or the sending module 404. The preview message decoding sub-module performs a message interaction with the preview message display module, the receiving module 103 or the receiving module 403 respectively. And the preview message decoding sub-module converts the code received from the receiving module 103 or the receiving module 403 into the preview message based on a preset corresponding relation between the preview message and the code, and sends the preview message to the preview message display module 102 or the preview message display module 402.

The preview message collection sub-module further includes: a function operation monitoring module for monitoring the inputting of the preview message by the preview message input device.

There are three methods for the client, i.e., the sender 100 and the receiver 400, presetting the corresponding relation between the preview message and the code. A first method includes the following processes: presetting the corresponding relation between the preview message and the code at the sender 100; sending the corresponding relation to the receiver 400 for storage via the instant messaging server 200. The second method includes the following processes: presetting the corresponding relation between the preview message and the code at the receiver 400, and sending the corresponding relation to the sender 100 for storage via the instant messaging server 200. The third method includes the following processes: presetting the corresponding relation between the preview message and the code respectively at the sender 100 and at the receiver 400.

The corresponding relation between the preview message and the code set respectively at the sender 100 and at the receiver 400 is stored in the instant messaging module of the sender 100 or the receiver 400.

The corresponding relation between the preview message and the prompt message may also be set at the receiver 400. For example, when the preview message is word input, the prompt message is diamond which improves the impressibility of user. Alternatively, the corresponding relation between the code and the prompt message may be directly set; certainly, the premise is that the user of receiver is able to know the indication of the preview message indicated by the prompt message.

Figure 4:
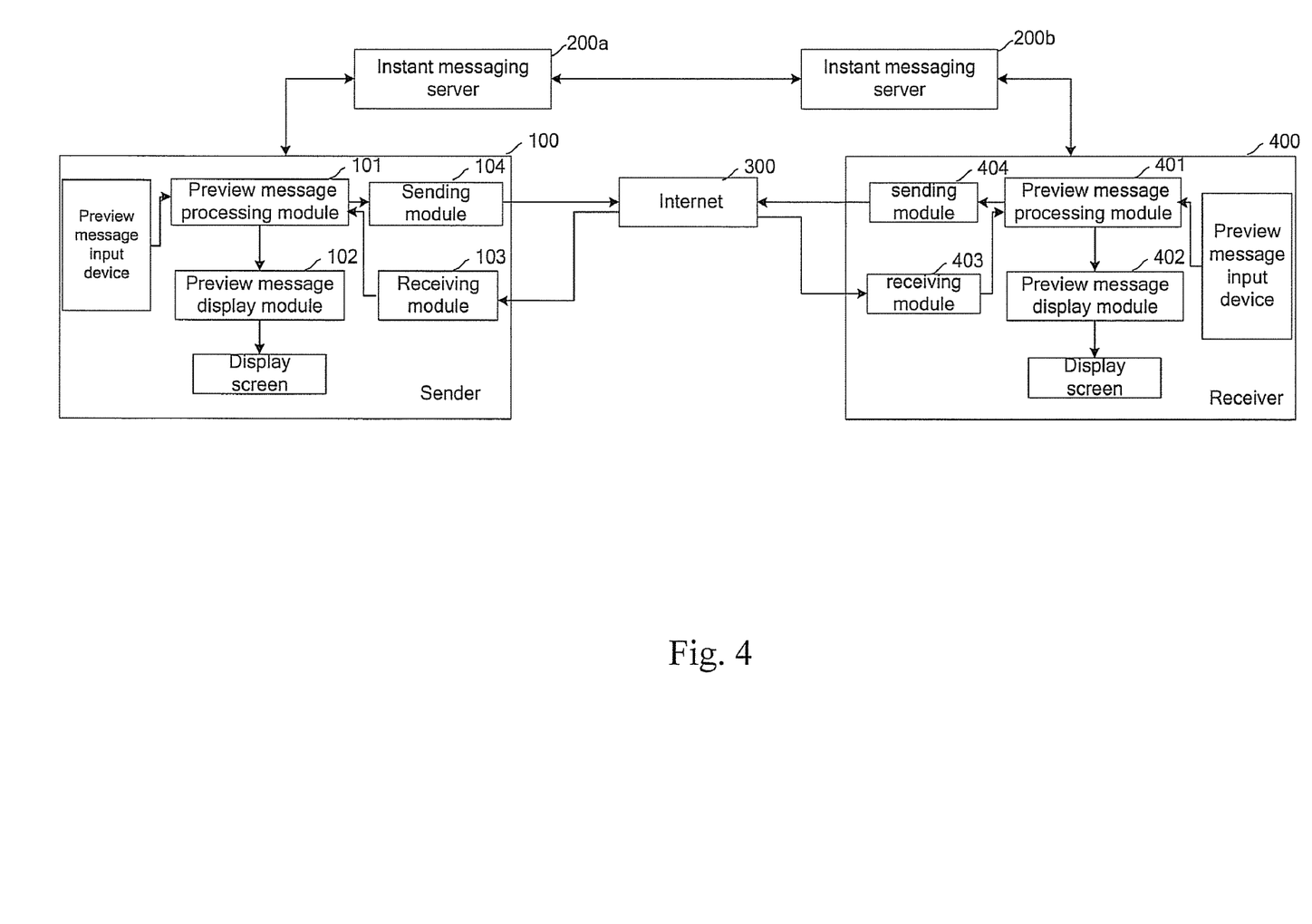
FIG. 4 is a network structure schematic diagram of instant messaging system in accordance with the present invention.

The sender 100 and the receiver 400 may also be clients of different instant messaging systems. FIG. 4 is a network structure schematic diagram of instant messaging system in accordance with the present invention. Referring to FIG. 4, there are two instant messaging servers. The instant messaging server 200a performs an instant customized message interaction with the instant messaging server 200b; the sender 100 and the instant messaging server 200a belong to one instant messaging system; the receiver 400 and the instant messaging server 200b belong to another instant messaging system. Before the sender 100 performs the instant message interaction with the receiver 400 via the Internet, the instant messaging server 200a performs the interaction of instant customized message with the instant messaging server 200b, i.e., the instant messaging server 200a establishes a message channel between the sender 100 and the receiver 400 via the Internet 300. After a coding method and a data format associated with the instant message are specified, for example after the corresponding relation between the preview message and the code is specified, the sender 100 and the receiver 400 perform the instant message transmission via the Internet 300 to complete the instant messaging.

The preview message input device may be a keyboard or manuscript input device, mouse and input screen.

Figure 5:
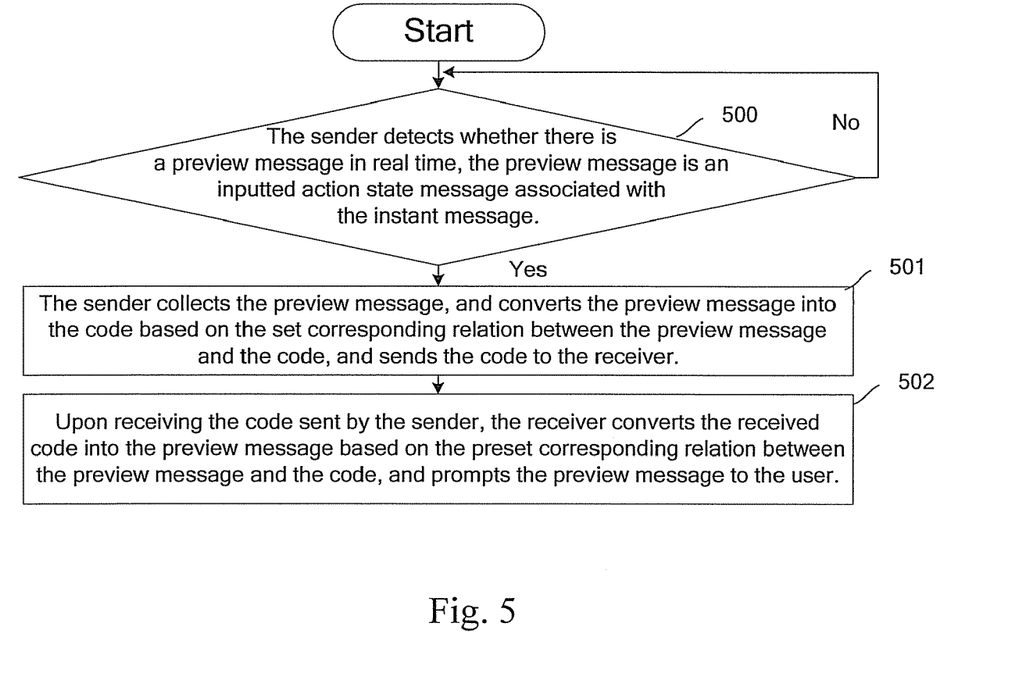
FIG. 5 is a flowchart illustrating a method for transmitting preview message in accordance with the present invention.

To transmit the preview message of sender to the receiver for display, a method for transmitting preview message is disclosed. FIG. 5 is a flowchart illustrating the method for transmitting preview message in accordance with the present invention. And the steps in the FIG. 5 are as follows.

Step 500: a sender detects whether there is preview message in real time, the preview message is an inputted action state message associated with the instant message; if there is preview message, proceeds to Step 501; otherwise, proceeds to Step 500.

The sender may detect whether there is preview message via a function operation monitoring module of preview message collection sub-module in the preview message processing module.

The preview message, i.e., the inputted action state message associated with the instant message, includes not only a change of instant message source, an operational method, an operational type and an instant message input screen, but also the change of inputted words, inserted pictures and selected scenes and actions.

The action state message inputted by instant message, can come from a keyboard or manuscript input device, a mouse and an input screen. For the keyboard or manuscript input device, the word message and content changing message may be detected. The manuscript input device may input words, or change the layout format of words and pictures via a shortcut key. The function operation monitoring module of preview message collection sub-module in the preview message processing module may detect the preview message by processing an event issued by the keyboard or the manuscript input device. For the mouse, the word, picture and scene action and content change may be detected. The instant messaging system provides various menu functions, and selects the menu functions to insert pictures, select scene action, copy/delete/move words and change the layout format of words/pictures/scenes via the mouse. The function operation monitoring module of preview message collection sub-module in the preview message processing module may monitor various menu functions, and detect the preview message via the function operation monitoring function. For the input screen, all preview message may be detected; the input screen is used to input the action state message that can not be inputted by other modes. The function operation monitoring module of preview message collection sub-module in the preview message processing module may acquire the location and size of an area changed, and detect the preview message by catching the input screen periodically and comparing a change between a former input screen and a latter input screen.

Step 501: the sender collects the preview message, converts the preview message into the code based on the set corresponding relation between the preview message and the code, and sends the code to the receiver.

Upon detecting that there is a preview message, the preview message collection sub-module of preview message processing module of the sender collects the preview message, and sends the collected preview message to the preview message coding sub-module of the preview message processing module. Upon acquiring the code based on the preset corresponding relation between the preview message and the code, the preview message coding sub-module sends the code to the sending mode of the sender; and the sending module sends the code to the receiving module of the receiver via the Internet.

The preset corresponding relation between the preview message and the code may be stored in the instant messaging module of the sender.

Step 502: upon receiving the code sent by the sender, the receiver converts the received code into the preview message based on the preset corresponding relation between the preview message and the code, and prompts the preview message to the user.

The corresponding relation between the preview message and the code preset at the receiver is the same as the corresponding relation between the preview message and the code preset at the sender.

The receiving module of the receiver sends the code received to the preview message decoding sub-module of the preview message processing module. After acquiring the corresponding preview message based on the preset corresponding relation between the preview message and the code, the preview message decoding sub-module sends the preview message to the preview message display module of the receiver. And the preview message display module provides the preview message to the user via the display screen or other prompt devices.

Certainly, the corresponding relation between the code and the prompt message indicating the preview message, or the corresponding relation between the preview message and the prompt message may also be set at the receiver, in order to prompt the prompt message to the user.

For example, upon receiving the code, the preview message decoding sub-module of preview message processing module in the receiver acquires the corresponding prompt message according to the code or the preview message converted from the code, and sends the prompt message to the preview message display module. The preview message display module displays the prompt message on a display screen. For example, when the code received is 01, one black diamond is displayed, and the user knows the sender is inputting words; when the code received is 02, the black diamond displayed disappears, and the user knows the sender is editing words; when the code received is 03, one color diamond is displays, and the user knows the sender is pasting pictures. Certainly, the preview message indicated by the display logo will be preset at the receiver.

The code corresponding to the preview message may be indicated by multi-bit data or letters.

The Internet is used for transmitting the code corresponding to the preview message between the sender and the receiver. The code may be transferred by a central server preset in the Internet, or be transmitted via the Internet by using the Point-to-Point (P2P) technology.

Because the user needs a period of time to organize the preview message, the sender would send the code corresponding to the same preview message collected in real time, which would result in a resource waste of instant messaging system. The present invention provides one embodiment to avoid the resource waste of instant messaging system, as shown on the FIG. 6.

Figure 6:
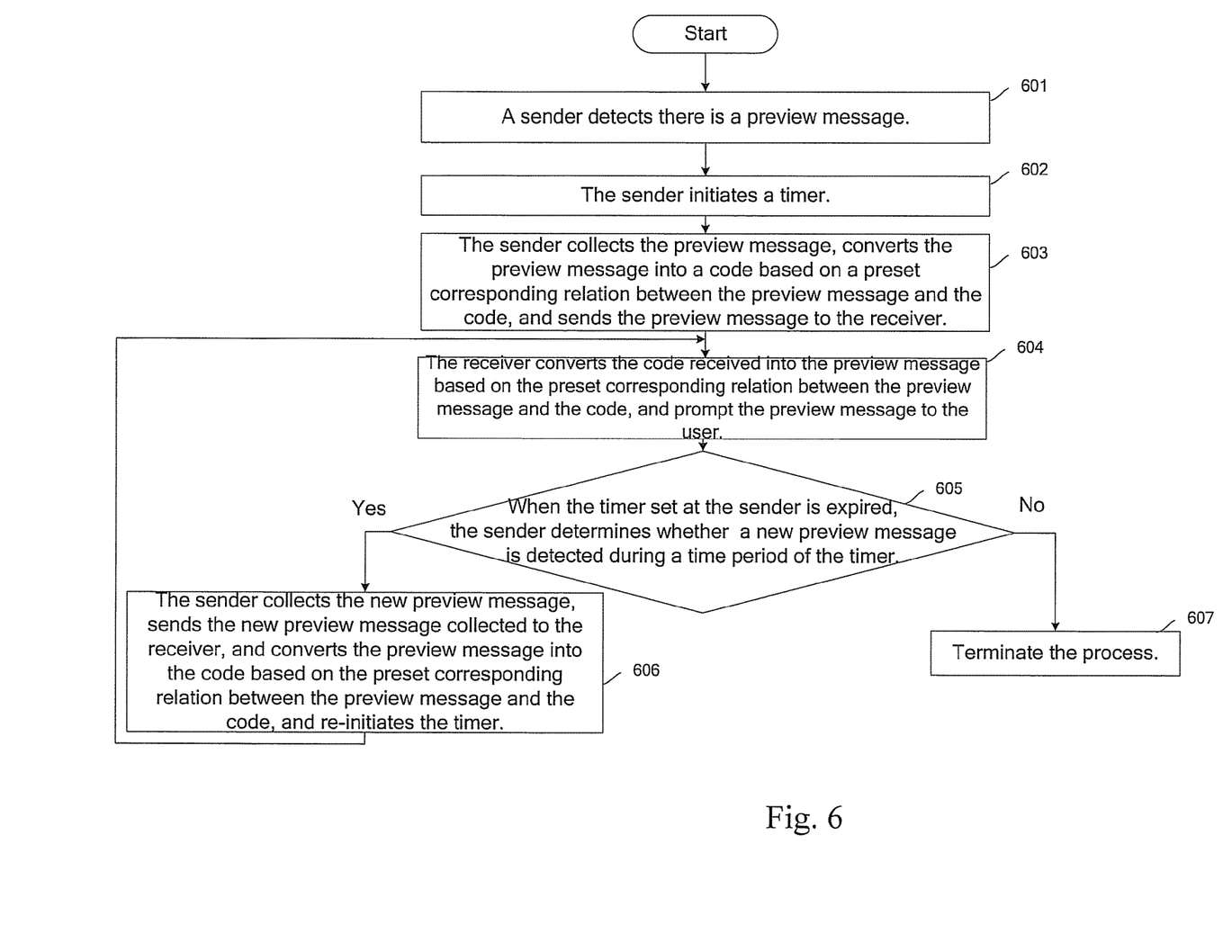
FIG. 6 is a flowchart illustrating the method for transmitting preview message in accordance with a first embodiment of the present invention.

FIG. 6 is a flowchart illustrating the method for transmitting preview message in accordance with a first embodiment of the present invention, and the steps of the first embodiment are as follows:

Step 601: a sender detects that there is a preview message.
Step 602: the sender initiates a timer.
Step 603: the sender collects the preview message, converts the preview message into a code based on a preset corresponding relation between the preview message and the code, and sends the preview message to the receiver.

Step 604: the receiver converts the code received into the preview message based on the preset corresponding relation between the preview message and the code, and prompt the preview message to the user.

Certainly, when the corresponding relation between the code and the prompt message indicating the preview message is set at the receiver, the code may also be converted into the prompt message indicating the preview message, and the prompt message indicating the preview message is prompted to the user. When the corresponding relation between the preview message and the prompt message is set at the receiver, the code may also be converted into the prompt message indicating the preview message, and the prompt message indicating the preview message is prompted to the user.

Step 605: when the timer set at the sender is expired, the sender determines whether a new preview message is detected during a time period of the timer, if the new preview message is detected, proceed to Step 606; otherwise, proceed to Step 607.

The new preview message may be the same as or different from the preview message collected in Step 603.

Step 606: the sender collects the new preview message, sends the new preview message collected to the receiver, and converts the preview message into the code based on the preset corresponding relation between the preview message and the code, and re-initiates the timer. And proceed to Step 604.

Step 607: terminate the process.

In Step 604, upon receiving the code, the receiver initiates a timer of which the time period is equal to or greater than the time period of the timer in the sender. At the same time, the receiver converts the code received into the preview message based on the preset corresponding relation between the preview message and the code. When the timer is expired, the receiver determines whether receive a new code during the time period of the timer. If the receiver receives the new code, proceed to Step 604, and re-initiate the timer; otherwise, terminate the process.

There are some disadvantages of using the method described in FIG. 6. At first, to organize the preview message in time, the time period of the timer set at the sender or at the receiver is generally in a range of 5~10 seconds in practical applications. However in general, the time for a user organizing the preview message will exceeds 5~10 seconds; if the time for the user organizing the preview message exceeds the time period of the timer, the sender will send the code converted by the preview message with a time period which is not less than the time period of the timer. In this way, there are multiple codes to be sent during an organization of the preview message, which requires more network bandwidth of instant messaging system, and wastes the instant messaging system resource and reduces the efficiency of the instant messaging system. Secondly, the receiver needs to set the timer frequently, and needs to detect whether receive a new code frequently when the timer is expired, which also increases a burden of instant messaging system, and wastes the instant messaging system resource and reduces the efficiency of the instant messaging system.

However, in FIG. 6 the preview message can be collected in real time, and can be transmitted at a regular interval. So the receiver may receive the preview message sent by the sender in time and prompt the preview message to the user. The method described in FIG. 6 is applicable to a case of requiring a high accuracy for the preview message received.

The present invention further provides another embodiment.

Figure 7:
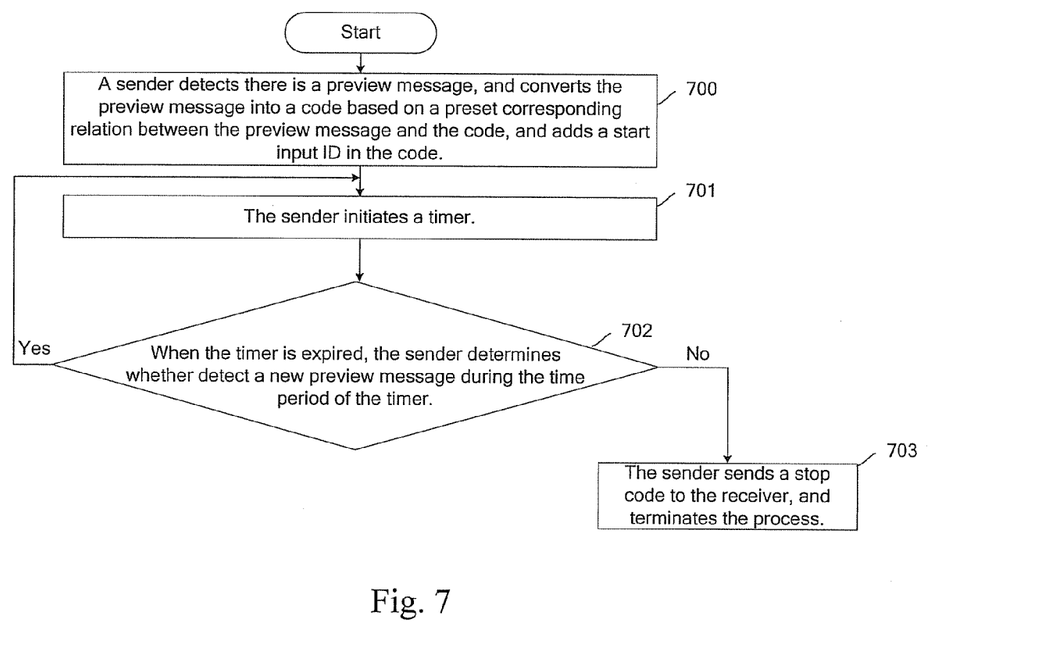
FIG. 7 is a flowchart illustrating the method for the sender transmitting preview message in accordance with a second embodiment of the present invention.

FIG. 7 is a flowchart illustrating a method for the sender sending preview message in accordance with a second embodiment of the present invention, and the steps of the second embodiment are as follows.

Step 700: a sender detects there is a preview message, and converts the preview message into a code based on a preset corresponding relation between the preview message and the code, and adds a start input ID in the code.

In the Step 700, the code may be set by communication protocol and communication mode of instant messaging system. And the start input ID and a sub-type of the preview message may be added to the code. In general, the code may be set as: message head (MsgHead)+sub-protocol number (SubCmd)+protocol body (Status). The MsgHead is a protocol head of the code; the SubCmd is a sub-protocol number for indicating preview message; and the Status is used for carrying the start input ID or a stop input ID. For example, when the Status equals to 1, the Status indicates a starting input; and when the Status equals to 0, the Status indicates a stopping input. Certainly, such two cases may be indicated by other codes.

Step 701: the sender initiates a timer.

A time period of the timer may be determined by a user inputting habit, an input device type or an input data type. If the time period is too short, a normal input interval of user may be regarded as a stop input signal of user; if the time period is too long, a stop input of user may also be regarded as one input interval, which leads to the receiver prompting the code indicating the sender is organizing the preview message, after the user has stopped inputting for a long time. In general, for a user inputting by a keyboard, there is no change for an input window within 7~10 seconds, which indicates that the user is not organizing the preview message, and the time period of the timer may be set as 7~10 seconds.

Step 702: when the timer is expired, the sender determines whether detect a new preview message during the time period of the timer. If detect the new preview message, proceed to Step 701; otherwise, proceed to Step 703.

In the Step 702, the preview message detected may be the same as or different from the preview message detected in Step 700.

Step 703: the sender sends a stop code to the receiver, and terminates the process.

The stop code has the same data format as the code sent in Step 700, only the start input ID carried by the Status is different from the start input ID sent in Step 700.

Being different from the method described in the FIG. 6, the method described in the FIG. 7 includes: re-initiating the timer when detect that there is preview message. In this way, a great deal of codes are not to be sent during an organization of the preview message, network bandwidth of the instant messaging system is not required too much, the resource instant messaging system should not be wasted, and the efficiency of the instant messaging system should not be reduced. However, in the method described in FIG. 7, if there is preview message detected when the timer is expired, the code corresponding to the preview message is not transmitted. The receiver is unable to acquire the right preview message and still regards the preview message detected is the preview message corresponding to the received code, when the preview message detected is different from the preview message corresponding to the sent code. The method described in FIG. 7 is applicable to a case of requiring no high accuracy of the received preview message.

The SubCmds of the code sent from the sender to the receiver during different time periods of the timer may be different for indicating different preview message.

Figure 8:
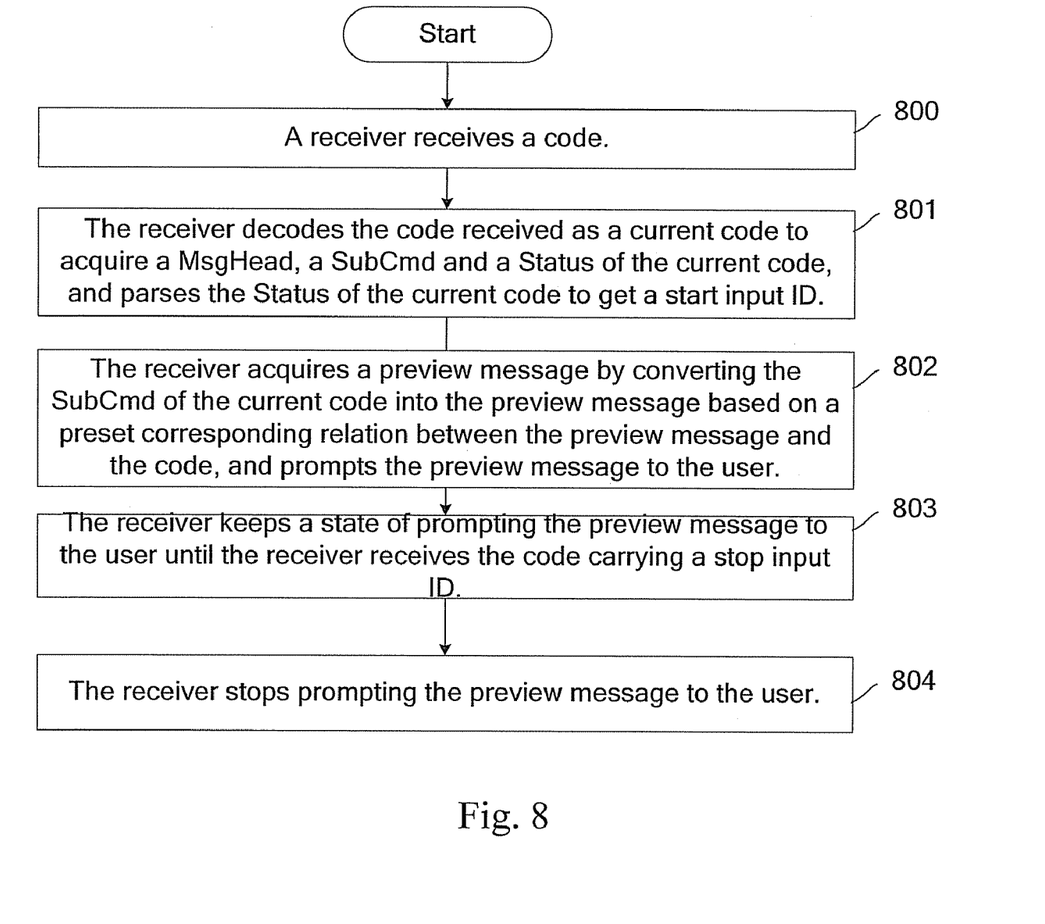
FIG. 8 is a flowchart illustrating the method for the receiver receiving preview message in accordance with the second embodiment of the present invention.

FIG. 8 is a flowchart illustrating the method for the receiver receiving preview message in accordance with the second embodiment of the present invention, and the steps of the second embodiment are as follows.

Step 800: a receiver receives a code.

Step 801: the receiver decodes the code received as a current code to acquire a MsgHead, a SubCmd and a Status of the current code, and parses the Status of the current code to get a start input ID.

Step 802: the receiver acquires a preview message by converting the SubCmd of the current code into the preview message based on a preset corresponding relation between the preview message and the code, and prompts the preview message to the user.

Step 803: the receiver keeps a state of prompting the preview message to the user until the receiver receives the code carrying a stop input ID. And proceed to Step 804.

Step 804: the receiver stops prompting the preview message to the user.

In the method described in FIG. 8, a timer should not be set frequently and should not frequently detect whether there is a new code coming when the timer is expired, which does not increase a burden of the instant messaging system, and avoid the resource of the receiver being wasted and the efficiency being reduced. However, the method has the problem that it is impossible to know the preview message organized by the user of sender currently. Therefore, the method described in FIG. 8 is applicable to a case of requiring no high accuracy of the received preview message.

The foregoing descriptions are preferred embodiments of the present invention and are not for use in limiting the protection scope thereof.

The invention claimed is:

1. A system for transmitting preview message in an instant messaging system, comprising:

a receiver including a first preview message processing module, a first preview message display module and a first receiving module;

a sender including a second preview message processing module and a second sending module;

an instant messaging server for transmitting an instant customized message between the sender and the receiver; and an Internet for transmitting an instant message between the sender and the receiver;

wherein when the receiver and the sender exchanges instant messages, the second preview message processing module is configured to collect a preview message, convert the preview message into a code, and transmit the code to the second sending module; the preview message comprising an inputted action state message associated with the instant message, the inputted action state message indicating change of operations during exchanging of the instant messages;

the second preview message processing module is further configured to initiate a first timer while collecting the preview message, to determine whether detect a new preview message during a time period of the first timer if the first timer is expired, and if it is determined that a new preview message is detected, to proceed to collect the preview message and to re-initiate the first timer; and if the new preview message is not detected during the time period of the first timer, sending a stop code to the receiver and terminating the process;

the second sending module is configured to send the code to the first receiving module via the Internet;

the first receiving module is configured to send the code to the first preview message processing module;

the first preview message processing module is configured to convert the code into a prompt message indicating the preview message, and send the prompt message to the first preview message display module for prompt.

2. The system of claim 1, wherein the sender further comprises a second receiving module and a second preview message display module; the receiver further comprises a first sending module;

the first preview message processing module is further configured to convert the previewed message into the code, and send the code to the first sending module;

the first sending module is configured to send the code to the second receiving module via the Internet;

the second receiving module is configured to send the code to the second preview message processing module;

the second preview message processing module is further configured to convert the code into the prompt message indicating the preview message, and send the prompt message to the second preview message display module for prompt.

3. The system of claim 2, wherein the first preview message processing module further comprises: a first preview message collection sub-module, a first preview message coding sub-module and a first preview message decoding sub-module; and the first preview message collection sub-module is configured to send the preview message received to the first preview message coding sub-module;

the first preview message coding sub-module is configured to converting the preview message into the code, and send the code to the first sending module;

the first preview message decoding sub-module is configured to convert the code received from the first receiving module into the prompt message indicating the preview message and sending the prompt message to the first preview message display module.

4. The system of claim 2, wherein the second preview message processing module further comprises: a second preview message collection sub-module, a second preview message coding sub-module and a second preview message decoding sub-module; and the second preview message collection sub-module is configured to send the preview message received to the second preview message coding sub-module;

the second preview message coding sub-module is configured to converting the preview message into the code, and send the code to the second sending module;

the second preview message decoding sub-module is configured to convert the code received from the second receiving module into the prompt message indicating the preview message and sending the prompt message to the second preview message display module.

5. The system of claim 2, wherein the first preview message processing module, the second preview message processing module, the first preview message display module, and the second preview message display module are set in an instant messaging module; and the instant messaging module is further configured to store a corresponding relation between the preview message and the code, so that the preview message processing module performs a conversion between the preview message and the code based on the relationship obtain from the instant messaging module.

6. The system of claim 1, wherein the first preview message processing module, the second preview message processing module, and the first preview message display module are set in an instant messaging module; and the instant messaging module is further configured to store a corresponding relation between the preview message and the code, so that the preview message processing module performs a conversion between the preview message and the code based on the relationship obtain from the instant messaging module.

7. The system of claim 6, wherein the instant messaging module is further configured to store a corresponding relation between the preview message and a prompt message indicating the preview message, so that the preview message processing module performs a conversion between the preview message and the prompt message indicating the preview message based on the corresponding relation obtained from the instant messaging module.

8. The system of claim 6, wherein the instant messaging module is further configured to store a corresponding relation between the code and the prompt message indicating the preview message, so that the preview message processing module performs a conversion between the code and the prompt message indicating the preview message based on the corresponding relation obtained from the instant messaging module.

9. A computer comprising a processor and memory for storing a client for transmitting preview message in an instant messaging system, the client comprising: a preview message processing module, a preview message display module, a sending module and a receiving module; the client being configured on the computer acting as a sender or a receiver;

wherein:

when the computer configured with the client acts as the sender, the preview message processing module is configured to collect a preview message, convert the preview message into a code, and send the code to the sending module; the preview message comprising an inputted action state message associated with the instant message, the inputted action state message indicating change of operations during exchanging of the instant messages; the preview message processing module is further configured to initiate a first timer while collecting the preview message, to determine whether detect a new preview message during a time period of the first timer if the first timer is expired, and if it is determined that a new preview message is detected, to proceed to collect the preview message and to re-initiate the first timer; and if the new preview message is not detected during the time period of the first timer, sending a stop code to the receiver and terminating the process; the sending module is configured to transmit the code from the preview message processing module; and, when the computer configured with the client acts as the receiver, the preview message processing module is configured to convert the code received from the receiving module into a prompt message indicating the preview message, send the prompt message to the preview message display module for prompt; the receiving module is configured to send the code received to the preview message processing module.

10. The computer of claim 9, wherein the preview message processing module further comprises: a preview message collection sub-module, a preview message coding sub-module and a preview message decoding sub-module;

the preview message collection sub-module is configured to send the preview message received to the preview message coding sub-module;

the preview message coding sub-module is configured to convert the preview message into the code, and send the code to the sending module;

the preview message decoding sub-module is configured to convert the code received from the receiving module into the prompt message indicating the preview message, and send the prompt message to the preview message display module.

11. The computer of claim 9, wherein the preview message processing module and the preview message display module are set in an instant messaging module; and the instant messaging module is further configured to store a corresponding relation between the preview message and the code, so that the preview message processing module performs a conversion between the preview message and the code based on the corresponding relation obtained from the instant messaging module.

12. The computer of claim 11, wherein the instant messaging module is further configured to store a corresponding relation between the preview message and the prompt message indicating the preview message, so that the preview message processing module performs a conversion between the preview message and the prompt message indicating the preview message based on the corresponding relation obtained from the instant messaging module.

13. The computer of claim 11, wherein the instant messaging module is further configured to store a corresponding relation between the code and the prompt message indicating the preview message, so that the instant messaging module performs a conversion between the code and the prompt message indicating the preview message based on the corresponding relation obtained from the instant messaging module.

14. A method for transmitting preview message in an instant messaging system, comprising:

collecting, by a computer acting as a sender, a preview message, converting the preview message into a code based on a corresponding relation between the code and the preview message, and sending the code to a computer acting as a receiver; the preview message comprising an inputted action state message associated with the instant message, the inputted action state message indicating change of operations during exchanging of the instant messages;

initiating, by the computer acting as the sender, a first timer, while collecting the preview message;

if the first timer is expired, determining, by the computer acting as the sender, whether detect a new preview message during a time period of the first timer;

if it is determined that a new preview message is detected, proceeding, by the computer acting as the sender, to collect the preview message and re-initiating the first timer; and, if the new preview message is not detected during the time period of the first timer; sending, by the computer acting as the sender, a stop code to the computer acting as the receiver and terminating the process;

converting, by the computer acting as the receiver, the code received from the computer acting as the sender into a prompt message indicating the preview message for prompt.

15. The method of claim 14, wherein the computer acting as sender and the computer acting as the receiver are configured with the clients of the same instant messaging system or different instant messaging systems.

16. The method of claim 14, wherein the converting by the computer acting as the receiver the code received from the computer acting as the sender into a prompt message indicating the preview message for prompt comprises:

setting a corresponding relation between the code and the prompt message indicating the preview message at the computer acting as the receiver; and converting, by the computer acting as the receiver, the code into received from the computer acting as the sender into the prompt message indicating the preview message based on the corresponding relation.

17. The method of claim 14, wherein the converting by the computer acting as the receiver the code received from the computer acting as the sender into a prompt message indicating the preview message for prompt comprises:

setting a corresponding relation between the code and the preview message at the computer acting as the receiver;

setting a corresponding relation between the preview message and the prompt message indicating the preview message at the computer acting as the receiver;

acquiring, by the computer acting as the receiver, the preview message corresponding to the code based on the corresponding relation between the code and the preview message;

acquiring, by the computer acting as the receiver, the prompt message indicating the preview message corresponding to the preview message based on the corresponding relation between the preview message and the prompt message indicating the preview message.

18. The method of claim 17, wherein the corresponding relation between the code and the preview message at the computer acting as the sender is same with the corresponding relation between the code and the preview message at the computer acting as the receiver; and the setting the corresponding relation between the code and the preview message comprises one of the following processes:

presetting the corresponding relation between the code and the preview message by the computer acting as the sender, and sending the corresponding relation between the code and the preview message to the computer acting as the receiver via an instant messaging server located between the computer acting as the sender and the computer acting as the receiver;

presetting the corresponding relation between the code and the preview message by the computer acting as the receiver, and sending the corresponding relation between the code and the preview message to the computer acting as the sender via the instant messaging server located between the computer acting as the sender and the computer acting as the receiver; and setting the corresponding relation between the code and the preview message respectively at the computer acting as the receiver and the computer acting as at the sender.

19. The method of claim 14, further comprising:

detecting, by the computer acting as the sender, whether there is the preview message in real time; if there is the preview message, proceeding to collect by the computer acting as the sender the preview message; otherwise, proceeding to detect whether there is the preview message in real time.

20. The method of claim 14, further comprising:

initiating, by the computer acting as the receiver, a second timer while receiving the code, and the time period of the second timer is not less than the time period of the first timer set at the computer acting as the sender;

if the second timer at the computer acting as the receiver is expired, determining whether receive the new code by the computer acting as the receiver during the time period of the second timer;

if detect the new code, proceeding to convert by the computer acting as the receiver the code received from the computer acting as the sender into the prompt message indicating the preview message for prompt, and re-initiating the second timer.

21. The method of claim 14, further comprising: determining, by the computer acting as the receiver, whether the code received carries a start input ID while receiving the code;

if the code received carries the start input ID, proceeding to convert by the computer acting as the receiver the code received from the computer acting as the sender into the prompt message indicating the preview message for prompt; otherwise, stopping, by the computer acting as the receiver, prompting the prompt message indicating the preview message corresponding to the code.

22. The method of claim 21, wherein the code comprises a message head (MsgHead), a sub-protocol number (SubCmd) and a protocol body (Status); and the SubCmd is used for indicating the preview message;

the Status is used for carrying the start input ID or a stop input ID.

23. The method of claim 14, wherein the code comprises a message head (MsgHead), a sub-protocol number (SubCmd) and a protocol body (Status); and the SubCmd is used for indicating the preview message;

the Status is used for carrying a start input ID or a stop input ID.

* * * * *